(12) United States Patent
Kim et al.

(10) Patent No.: US 9,794,838 B2
(45) Date of Patent: Oct. 17, 2017

(54) CELL INFORMATION TRANSMISSION/RECEPTION METHOD AND APPARATUS FOR USE IN WIRELESS COMMUNICATION SYSTEM

(71) Applicant: Samsung Electronics Co., Ltd., Suwon-si, Gyeonggi-do (KR)

(72) Inventors: Taeyoon Kim, Seongnam-si (KR); Heunchul Lee, Pocheon-si (KR); Jonghan Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/282,351

(22) Filed: May 20, 2014

(65) Prior Publication Data

US 2014/0349655 A1   Nov. 27, 2014

Related U.S. Application Data

(60) Provisional application No. 61/826,658, filed on May 23, 2013.

(30) Foreign Application Priority Data

Aug. 21, 2013   (KR) ........................ 10-2013-0098890

(51) Int. Cl.
*H04W 36/00* (2009.01)
*H04W 88/08* (2009.01)
*H04W 24/02* (2009.01)

(52) U.S. Cl.
CPC ....... *H04W 36/0061* (2013.01); *H04W 88/08* (2013.01); *H04W 24/02* (2013.01)

(58) Field of Classification Search
CPC combination set(s) only.
See application file for complete search history.

(56) References Cited

U.S. PATENT DOCUMENTS

| 2010/0113031 | A1  | 5/2010  | Kim et al. |
| 2011/0207456 | A1* | 8/2011  | Radulescu et al. ........... 455/434 |
| 2012/0236776 | A1* | 9/2012  | Zhang ................... H04W 48/12 370/312 |
| 2013/0188624 | A1* | 7/2013  | Lee ........................ H04W 24/02 370/338 |
| 2014/0321388 | A1  | 10/2014 | Jeong et al. |

(Continued)

FOREIGN PATENT DOCUMENTS

| GB | 2494754 A | 3/2012 |
| KR | 10-2009-0092425 A | 9/2009 |
| KR | 10-2011-0135174 A | 12/2011 |

(Continued)

*Primary Examiner* — Idowu O Osifade
(74) *Attorney, Agent, or Firm* — Jefferson IP Law, LLP (57) ABSTRACT

A cell information transmission/reception method and an apparatus are provided for use in a wireless communication system. A cell information transmission method of a base station in a wireless communication system according to the present disclosure includes transmitting, by the base station, system information to a terminal, the system information including a neighbor cell list having at least one cell Identifier (ID), and transmitting, by the base station, cell information on at least one cell selected according to a predetermined rule based on the neighbor cell list to the terminal.

22 Claims, 10 Drawing Sheets

(56) References Cited

U.S. PATENT DOCUMENTS

2015/0124673 A1* 5/2015 Ouchi ................ H04W 52/146
　　　　　　　　　　　　　　　　　　　370/311
2015/0341949 A1* 11/2015 Nagata ................ H04L 5/0098
　　　　　　　　　　　　　　　　　　　370/329

FOREIGN PATENT DOCUMENTS

| KR | 10-2013-0037176 A | 4/2013 |
| WO | 2013/006117 A1 | 1/2013 |

* cited by examiner

FIG. 1

```
CRS-AssistanceInfoList-r11 ::= SEQUENCE (SIZE (1..maxCellReport)) OF CRS-AssistanceInfo-r11
CRS-AssistanceInfoList-r11 ::= SEQUENCE {
    physCellId-r11                physCellId,
    antennaPortsCount-r11         ENUMERATED {an1, an2, an4, spare1},
    mbsfn-SubframeConfigList-r11  MBSFN-SubframeConfigList,
    ...
}
```

FIG. 2

```
IntraFreqNeighCellList ::=    SEQUENCE (SIZE (1..maxCellIntra)) OF IntraFreqNeighCellInfo IntraFreqNeighCellList ::=    SEQUENCE {
    physCellId                    physCellId,
    q-offsetCell                  Q-offsetRange,
    ...
}
```

FIG. 3

```
IntrerFreqNeighCellList ::=    SEQUENCE (SIZE (1..maxCellInter)) OF InterFreqNeighCellInfo IntrerFreqNeighCellList ::=    SEQUENCE {
    physCellId                     physCellId,
    q-offsetCell                   Q-offsetRange
}
```

CELL INFORMATION TRANSMISSION/RECEPTION METHOD AND APPARATUS FOR USE IN WIRELESS COMMUNICATION SYSTEM

CROSS-REFERENCE TO RELATED APPLICATION(S)

This application claims the benefit under 35 U.S.C. §119 (e) of a U.S. Provisional application filed on May 23, 2013 in the U.S. Patent and Trademark Office and assigned Ser. No. 61/826,658, and under 35 U.S.C. §119(a) of a Korean patent application filed on Aug. 21, 2013 in the Korean Intellectual Property Office and assigned Serial number 10-2013-0098890, the entire disclosure of each of which is hereby incorporated by reference.

TECHNICAL FIELD

The present disclosure relates to a wireless communication system. More particularly, the present disclosure relates to a method and apparatus for transmitting/receiving cell information in the wireless communication system.

BACKGROUND

Mobile communication systems were developed to provide the subscribers with voice communication services on the move. With the rapid advance of technologies, the mobile communication systems have evolved to support high speed data communication services beyond the early voice-oriented services. However, the limited resource and user requirements for higher speed services in the current mobile communication system spur the evolution to more advanced mobile communication systems.

As one of the next-generation mobile communication systems to meet such requirements, standardization for a Long Term Evolution (LTE) system is underway in the $3^{rd}$ Generation Partnership Project (3GPP). LTE is a technology designed to provide high speed packet-based communication of up to 100 Mbps and aims at commercial deployment around 2010 timeframe. In order to provide high speed packet-based communication of up to 100 Mbps, a discussion is being held on several schemes: one scheme for reducing the number of nodes located in a communication path by simplifying a configuration of the network, and another scheme for maximally approximating wireless protocols to wireless channels.

In the multi-cell wireless communication system such as 3GPP LTE system, an evolved Node B (eNB) provides a User Equipment (UE) located within in the cell thereof with cell information using the system information. The eNB may transmit to the UE the neighbor cell information as well as cell information thereof due to various reasons.

In the case of LTE wireless communication system, there are total 504 cell IDs. Accordingly, at least 9 bits are used for the eNB to transmit the cell information to the UE.

However, the technology according to the related art has a drawback of requiring relatively large number of bits for cell information in the resource-constrained wireless communication system, resulting in waste of resource.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a cell information transmission method and apparatus that is capable of transmitting the cell information to the User Equipment (UE) efficiently in a wireless communication system.

Another aspect of the present disclosure is to provide a cell information transmission method and apparatus that is capable of adjusting the amount of the cell information to be transmitted to the UE dynamically.

In accordance with an aspect of the present disclosure, a cell information transmission method of a base station in a wireless communication system is provided. The cell information transmission method includes transmitting, by the base station, system information to a terminal, the system information including a neighbor cell list having at least one cell Identifier (ID), and transmitting, by the base station, cell information on at least one cell selected according to a predetermined rule based on the neighbor cell list to the terminal.

In accordance with another aspect of the present disclosure, a cell information reception method of a terminal in a wireless communication system is provided. The cell information reception method includes receiving, by the terminal, system information from a base station, the system information including a neighbor cell list having at least one cell ID, receiving, by the terminal, cell information on at least one cell selected according to a predetermined rule based on the neighbor cell list from the base station, and determining, by the terminal, the cell based on the neighbor cell list and the cell information.

In accordance with another aspect of the present disclosure, a base station transmitting cell information in a wireless communication system is provided. The base station includes a transceiver configured to transmit and receive signals to and from a terminal and a control unit configured to control the transceiver to transmit system information to a terminal, the system information including a neighbor cell list having at least one cell ID and cell information on at least one cell selected according to a predetermined rule based on the neighbor cell list to the terminal.

In accordance with another aspect of the present disclosure, a terminal receiving cell information in a wireless communication system is provided. The terminal includes a transceiver configured to transmit and receive signals to and from a base station and a control unit configured to control the transceiver to receive system information from a base station, the system information including a neighbor cell list having at least one cell ID, and cell information on at least one cell selected according to a predetermined rule based on the neighbor cell list from the base station and to determine the cell based on the neighbor cell list and the cell information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure a User Equipment (UE) may be an electronic device.

A description is made of the method for transmitting cell information (e.g., cell Identifier (ID)), to a UE efficiently in a multi-cell wireless communication system.

An evolved Node B (eNB) may send a UE the information on a cell thereof and/or neighbor cells thereof (e.g., cell IDs), for various purposes and necessities. For example, the eNB may notify the UE of the information on the cells influencing the UE dominantly. If the cell information is received from the eNB, the UE may execute a function of cancelling inter-cell interference based on the received information. The UE may use the received cell information for cooperative transmission among eNBs.

According to various embodiments of the present disclosure, the eNB may notify the UE of the information on the cell selected according to a predetermined rule (e.g., cell ID) for various purposes and necessities.

According to various embodiments of the present disclosure, the eNB notifies the UE of the information on the neighbor cells causing interference to the UE (e.g., interference cell ID), for inter-cell interference control. It should be noted that the subject matter of the present disclosure is not limited to the inter-cell interference control.

In the multi-cell wireless communication system including the 3$^{rd}$ Generation Partnership Project (3GPP) Long Term Evolution (LTE), a UE receives the information for use in demodulating the data received from a serving cell eNB. In the multi-cell system, the performance degradation at the cell edge which is caused by the inter-cell interference is one of significant issues.

In order to control the inter-cell interference problem, acquiring the information on the interferer cells (e.g., cell IDs of the interferer cells), may be required for channel estimation thereon. However, there is a large number of cell IDs available in a network to differentiate among overlaid cells. The large number of cell IDs available in a network causes necessity of a large number of information bits.

Various embodiments of the present disclosure propose a cell ID transmission method that may allow the eNB to transmit the cell ID information to the UE efficiently with a reduced number of information bits.

According to various embodiments of the present disclosure, the eNB sends the UE an index of the cell ID listed in the neighbor cell list provided to the UE previously other than the whole information on the interferer cell (e.g., interferer cell ID). The neighbor cell list may be included in the System Information Block (SIB) broadcast by the eNB.

According to various embodiments of the present disclosure, the neighbor cell list may include indices mapped to the respective cell IDs as shown in Table 1.

TABLE 1

| Index | Cell ID |
|-------|---------|
| 0 | Cell A |
| 1 | Cell B |
| 2 | Cell C |
| 3 | Cell D |
| — | — |
| — | — |
| — | — |

According to various embodiments of the present disclosure, the eNB may send the UE the index information bit corresponding to the cell ID contained in the neighbor cell list, for notifying of the interferer cell, using Downlink Control Information (DCI).

According to various embodiments of the present disclosure, the eNB may use Demodulation Reference Signal (DMRS) port configuration or scrambling identity field (n_scid) or a combination thereof to notify the UE of the interference cell.

Hereinafter, various embodiments of the present disclosure are described with reference to accompanying drawings in detail. The same reference numbers are used throughout the drawings to refer to the same or like parts. Detailed description of well-known functions and structures incorporated herein may be omitted to avoid obscuring the subject matter of the present disclosure.

Figure 1:
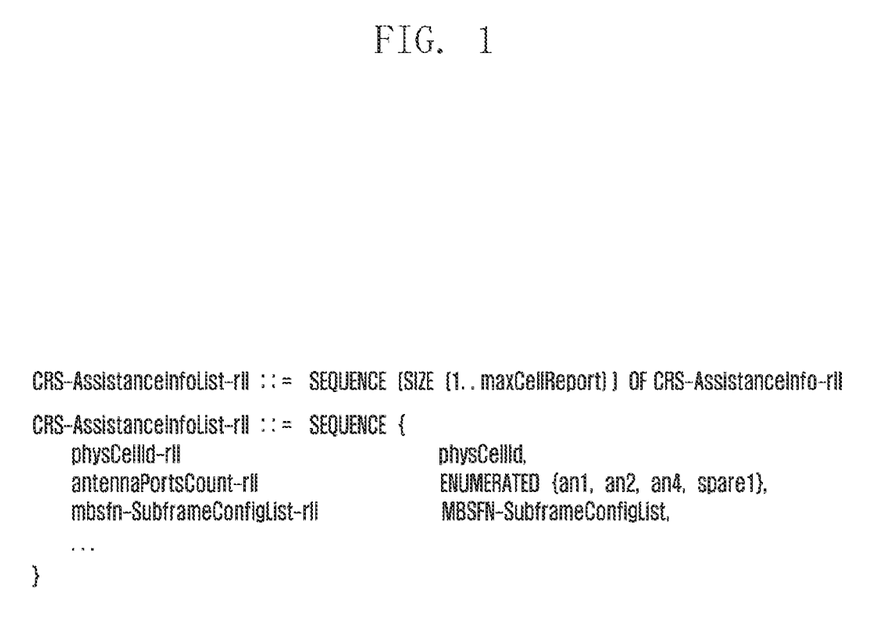
FIG. 1 is a diagram illustrating cell information in a higher layer message for use in a Long Term Evolution (LTE) radio communication system according to an embodiment of the present disclosure.

FIG. 1 is a diagram illustrating cell information in a higher layer message for use in an LTE radio communication system according to an embodiment of the present disclosure.

Referring to FIG. 1, in an LTE radio communication system, the cell information, particularly the information on the interferer cell, is included in the System Information Block (SIB) message (or system information message) for use in inter-cell interference control.

The UE may remove Common Reference Signal (CRS) of the interferer cell using the cell ID of the interferer cell which is included in the system information message.

However, because the system information message cannot be modified dynamically as described above, the information on the interferer cell to the UE may not be provided to the UE efficiently in the system in which the interference environment to the UE changes dynamically.

Figure 2:
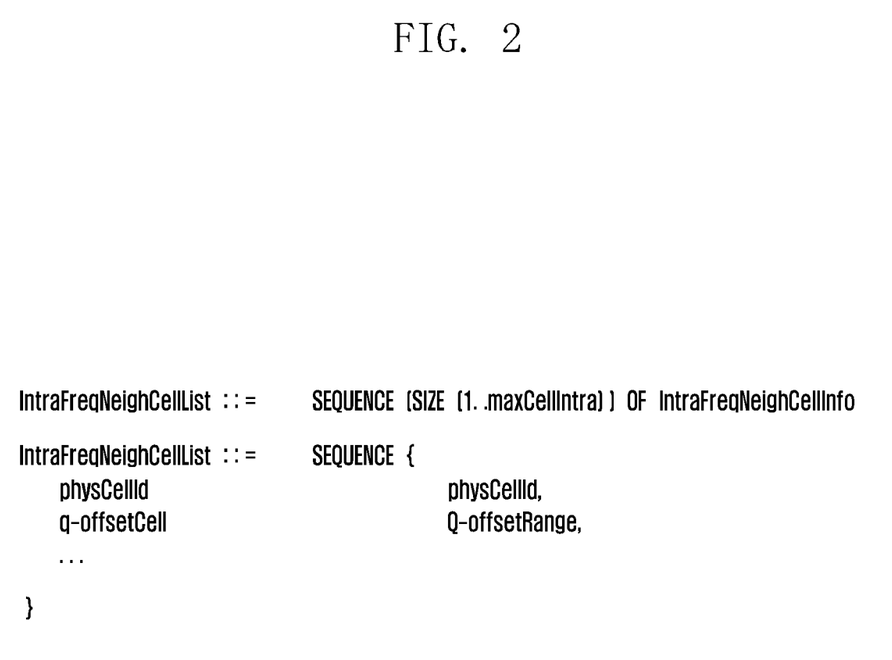
FIG. 2 is a diagram illustrating an intra-frequency neighbor cell list information for use in a wireless communication system according to an embodiment of the present disclosure.

FIG. 2 is a diagram illustrating an intra-frequency neighbor cell list information for use in a wireless communication system according to an embodiment of the present disclosure.

Referring to FIG. 2, in the LTE radio communication system, transmitting the intra-frequency neighbor cell list information to the UE using the system information message is possible.

Among the parameters shown in FIG. 2, "maxcelIntra" denotes a number of cell IDs included in the neighbor cell list. According to various embodiments of the present disclosure, the number of cell IDs included in the neighbor cell list (e.g., "maxcelIntra") parameter may be set to up to 16 to indicate that the intra-frequency neighbor cell list may include 16 cell IDs.

The intra-frequency neighbor cell list of FIG. 2 is transmitted to the UE using the system information which cannot be modified dynamically as described above and thus is not efficient for transmitting the information on the interferer cell to the UE in the system that dynamically varies in interference environment to UE.

Figure 3:
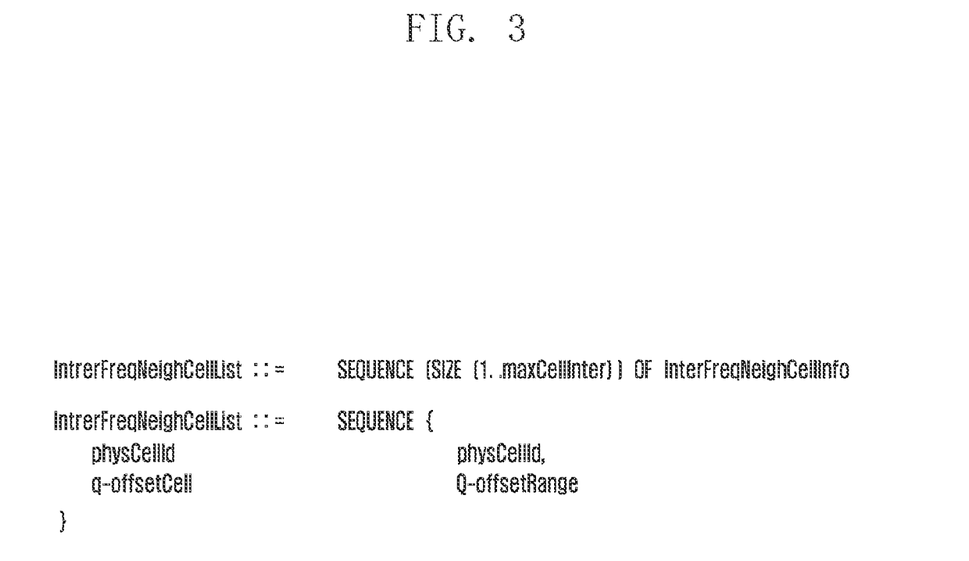
FIG. 3 is a diagram illustrating an inter-frequency neighbor cell list information for use in a wireless communication system according to an embodiment of the present disclosure.

FIG. 3 is a diagram illustrating an inter-frequency neighbor cell list information for use in a wireless communication system according to an embodiment of the present disclosure.

Referring to FIG. 3, in the LTE radio communication system, transmitting the inter-frequency neighbor cell list information to the UE using the system information message is possible.

Among the parameters shown in FIG. 3, "maxcelInter" denotes a number of cell IDs included in the neighbor cell list. According to various embodiments of the present disclosure, the number of cell IDs included in the neighbor cell list (e.g., "maxcelInter") parameter may be set to up to 16 to indicate that the intra-frequency neighbor cell list may include 16 cell IDs.

The inter-frequency neighbor cell list of FIG. 3 is transmitted to the UE using the system information which cannot be modified dynamically as described above and thus is not efficient for transmitting the information on the interferer cell to the UE in the system varying dynamically in interference environment to UE.

Figure 4:
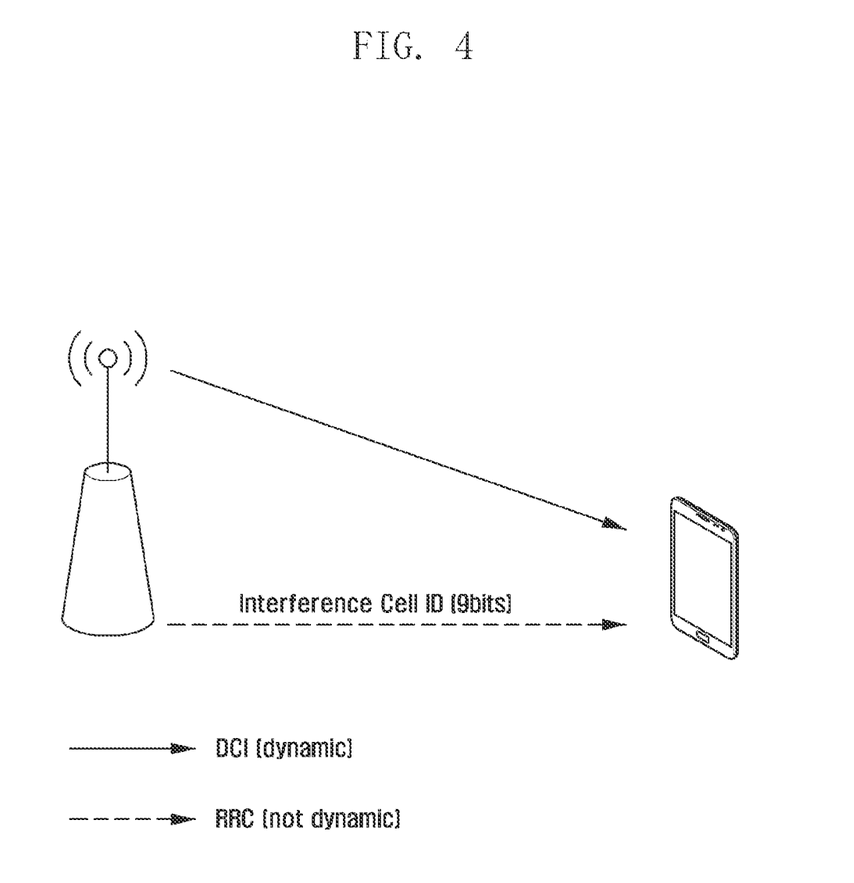
FIG. 4 is a diagram illustrating a method of transmitting cell information to a User Equipment (UE) in a wireless communication system according to an embodiment of the present disclosure.

FIG. 4 is a diagram illustrating a method of transmitting cell information to a UE in a wireless communication system according to an embodiment of the present disclosure.

Referring to FIG. 4, the eNB may send the UE the cell information. In particular, the eNB may send the UE the information on the interferer cell. In this case, when transmitting the cell information to the UE dynamically is necessary, the eNB may transmit the interferer cell information using the Downlink Control Information (DCI) of Physical Downlink Control Channel (PDCCH) as physical layer control information.

In this case, however, 9-bit information is required to transmit the cell ID of the interferer cell as the 9-bit information is used to differentiate among 504 cell IDs available in LTE.

Transmitting the interferer cell information using the DCI of PDCCH as physical layer control information increases the information amount of DCI so as to degrade control channel transmission efficiency.

In addition, the Radio Resource Control (RRC) message as a higher layer message (signaling) may not be used for transmitting the cell information to the UE dynamically.

According to various embodiments of the present disclosure, the eNB provides the UE with the cell ID information using the system information message other than transmitting the real cell ID value directly in order to overcome the above problem.

In more detail, the eNB may send the UE the neighbor cell list or neighbor measurement cell list in advance using the system information. The eNB also may send the UE an index corresponding to the cell ID based on the neighbor cell list. According to various embodiments of the present disclosure, the neighbor cell list may include at least one of the intra-frequency neighbor cell list and the inter-frequency neighbor cell list.

As described above, the cell ID to be transmitted to the UE may be the cell ID of the cell influencing the UE dominantly. The cell influencing the UE dominantly may be an interferer cell to cell.

In this way, notifying the UE of the interferer cell using a reduced number of bits instead of transmitting the whole 9-bit cell information is possible.

In this case, the eNB may sort the cells in an order by a predetermined criterion in the neighbor cell list transmitted in the system information. For example, the eNB may sorts the neighbor cells in an order by the dominance level of influence to specific or certain UE. The eNB also may generate the neighbor cell list in the sorted order.

The eNB may broadcast the system information message including the generated neighbor cell list.

In this case, the neighbor cell list may be updated periodically or non-periodically. For example, when a new cell (e.g., macro eNB or small eNB such as femto and femto cells) is deployed, the order of the dominance levels of influence to the UE may be changed by the newly deployed cell. In such case, the neighbor cell may be updated in the event-driven manner. For example, the neighbor cell list may be updated in response to deployment of a new cell.

The eNB may send the UE the cell information based on the neighbor cell list generated as described above. For example, the eNB may notify the UE of a specific cell by transmitting an index mapped to the cell ID of the specific cell which is included in the neighbor cell list instead of transmitting the cell ID itself.

According to this method, assuming that the maximum number of cells that can be listed in the neighbor cell list is 16, sending the UE the cell ID using only 4 bits is possible. As a result, the cell information transmission method according to various embodiments of the present disclosure is capable of transmitting the information with dramatically reduced number of bits as compared to the technology according to the related art that uses 9 bits for distinguishing among 504 cells. As a result, the cell information transmission method according to various embodiments of the present disclosure may improve resource utilization efficiency.

According to various embodiments of the present disclosure, the index mapped to the cell ID of the selected cell may be transmitted to UE using the Downlink Control Information (DCI).

Figure 5:
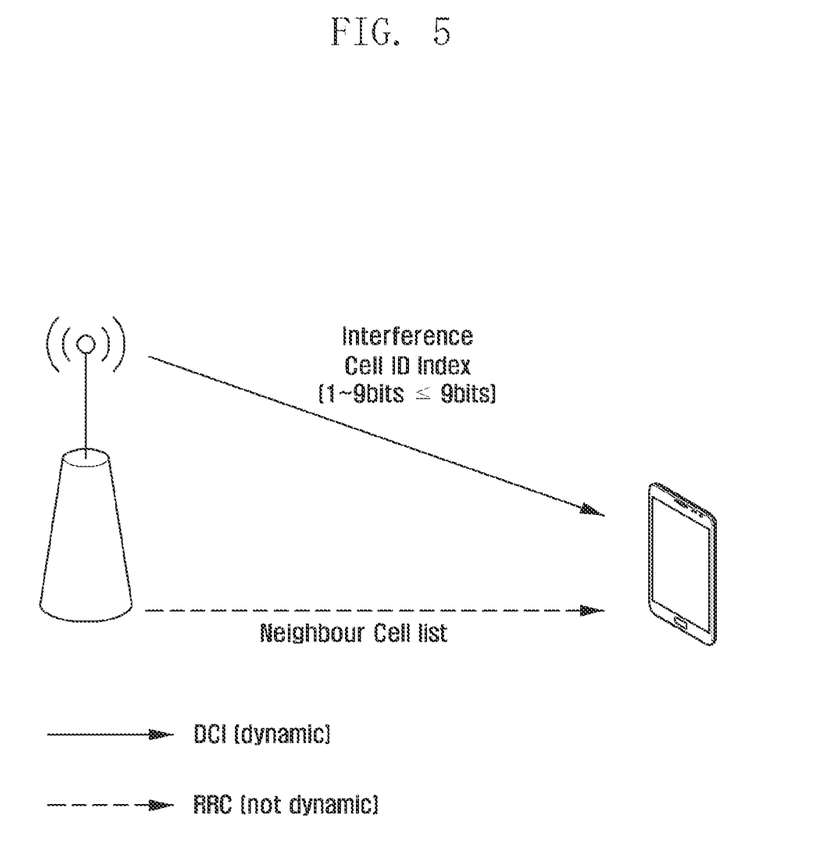
FIG. 5 is a diagram illustrating a method of transmitting an index corresponding to a cell Identifier (ID) to a UE using Downlink Control Information (DCI) according to an embodiment of the present disclosure.

FIG. 5 is a diagram illustrating a method of transmitting an index corresponding to a cell ID to a UE using DCI according to an embodiment of the present disclosure.

Referring to FIG. 5, the eNB according to various embodiments of the present disclosure may send the UE a neighbor cell list. The neighbor cell list may be transmitted to the UE using the system information.

The eNB checks (e.g., determines) the cell influencing the UE dominantly. According to the check result (e.g., the determination), the eNB retrieves the index corresponding to the checked cell based on the neighbor cell list.

The eNB may send the UE the selected index using the DCI format as provided in Table 2. The DCI format may be transmitted to the UE through Physical Downlink Control Channel (PDCCH) on the physical layer.

TABLE 2

| Parameter | Description | Bits |
| --- | --- | --- |
| Transport block to codeword swap flag | Notify whether swapped channel is applied when 2 transport blocks are transmitted through spatial multiplexing | 1 |
| HARQ process number | HARQ process number corresponding to transport block transmitted in corresponding subframe | 3 |
| Transport block 1 | Modulation and coding scheme | 5 |
| | New data indicator (for determining whether to retransmit HARQ information) | 1 |
| | Redundancy version (start position of packet transmitted in encoded packet) | 2 |
| Transport block 2 | Modulation and coding scheme | 5 |
| | New data indicator | 1 |
| | Redundancy version | 2 |
| Pre-coding information | Notify of precoding matrix index when using Pre-coding | 3 |
| Cell ID | Interference Cell ID | 4 |
| UE ID | Interference UE ID | 16 |
| Transmission mode | Interference transmission mode | 2 |
| CFI | Interference control formation indicator | 2 |
| Total | | 47 |

According to various embodiments of the present disclosure, implicitly transmitting the cell ID index may be possible.

Figure 6:
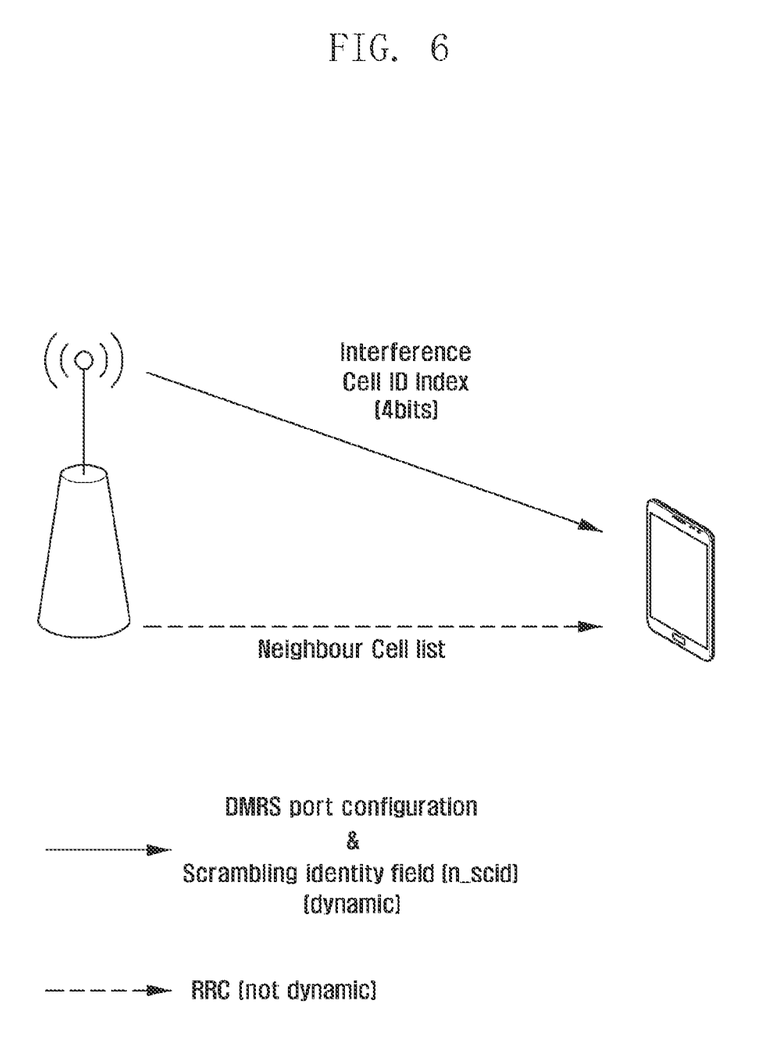
FIG. 6 is a diagram illustrating a method of transmitting cell ID index information according to an embodiment of the present disclosure.

FIG. 6 is a diagram illustrating a method of transmitting cell ID index information according to an embodiment of the present disclosure.

Referring to FIG. 6, in a case of restricting the information maximum cell index information to 2 bits (e.g., if 4 of the cell IDs ordered in the neighbor cell measurement list are used), the cell ID may be notified to the UE based on the Demodulation Reference Signal (DMRS) port configuration information and the scrambling identity field (n_scid) value.

In the case of Layer 1 transmission, the cell ID index information may be notified according to a combination of the DMRS port and scrambling identity field (n_scid) value.

Table 3 provides examples of the combinations of the DMRS ports and scrambling identity fields for implementing the above-described method.

TABLE 3

| DMRS port | scrambling identity field (n_scid) | Cell ID index |
| --- | --- | --- |
| 7 | 0 | 0 |
| 7 | 1 | 1 |
| 8 | 0 | 2 |
| 8 | 1 | 3 |

Figure 7:
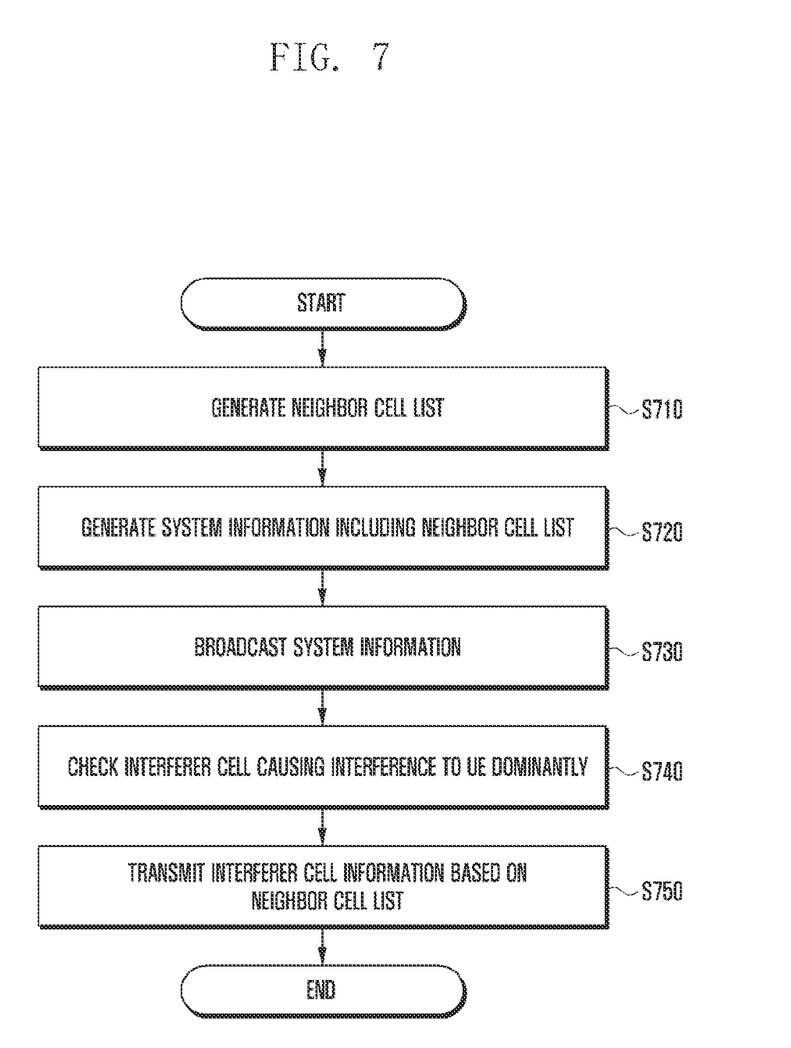
FIG. 7 is a flowchart illustrating the operation procedure of an evolved Node B (eNB) according to an embodiment of the present disclosure.

FIG. 7 is a flowchart illustrating the operation procedure of an eNB according to an embodiment of the present disclosure.

Referring to FIG. 7, at operation S710, the eNB generates a neighbor cell list. According to various embodiments of the present disclosure, the neighbor cell list may include at least one of an intra-frequency neighbor cell list and an inter-frequency neighbor cell list.

According to various embodiment of the present disclosure, the eNB may sort the cells in an order by a predetermined criterion in the neighbor cell list. For example, the eNB may sort the neighbor cells in an order of dominance level of influence to the specific or certain UE. The neighbor cell influencing the UE dominantly may be an interferer cell or a cell participated in the cooperative transmission with the serving cell of the UE.

The eNB may generate the neighbor cell list in the order determined as above. For example, the neighbor cells may be sorted in a descending order of influence level.

At operation S720, the eNB generates the system information including the neighbor cell list.

At operation S730, the eNB broadcasts the generated system information.

At operation S740, the eNB checks (e.g., determines) the cell which influences or may influence dominantly to certain or specific UE. According to various embodiments of the present disclosure, the dominantly influencing cell may be the interferer cell to the UE.

At operation S750, the eNB may send the UE the cell ID information based on the neighbor cell list. In this case, the eNB may check the index corresponding to the cell to be notified to the UE by referencing the neighbor cell list. The eNB may send the UE the check index information.

Figure 8:
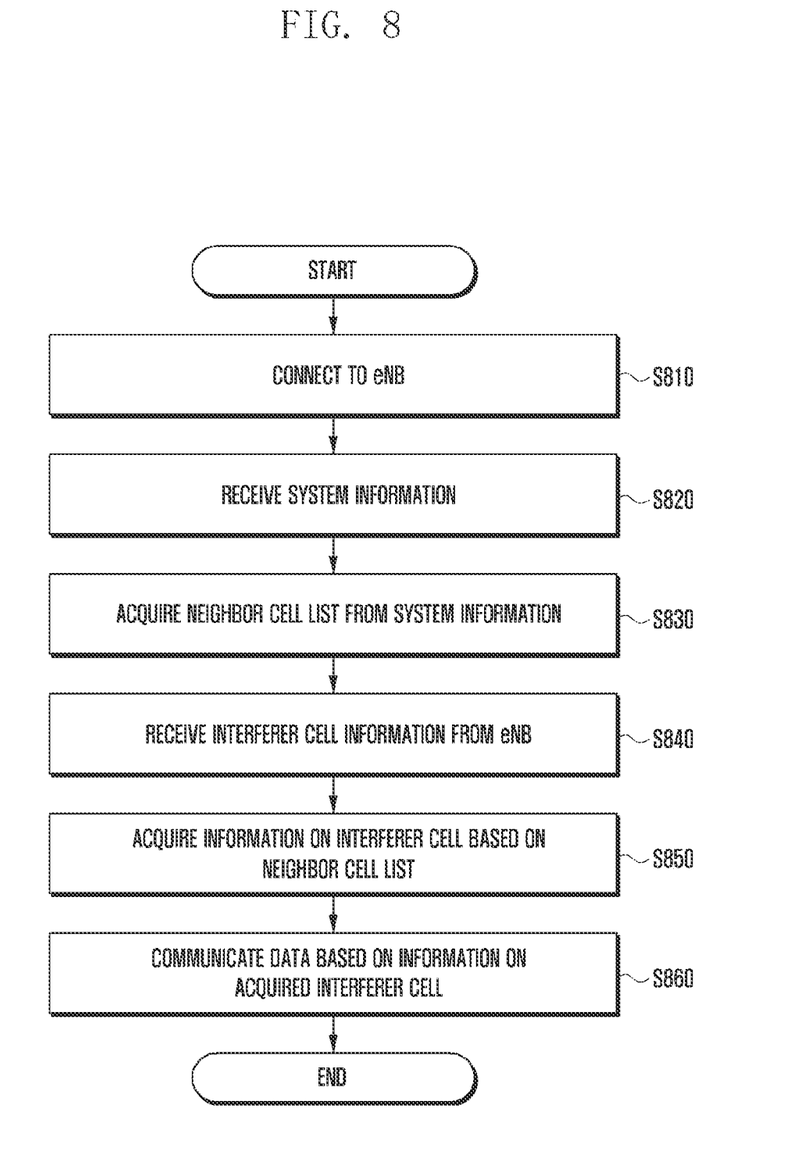
FIG. 8 is a flowchart illustrating an operation procedure of a UE according to an embodiment of the present disclosure.

FIG. 8 is a flowchart illustrating an operation procedure of a UE according to an embodiment of the present disclosure.

Referring to FIG. 8, at operation S810, the UE connects to the eNB. For example, if the UE powers on or performs handover, or if the radio connection is reestablished, the UE attempts connection to the eNB.

At operation S820, the UE may receive system information transmitted by the eNB.

At operation S830, the UE checks the neighbor cell list included in the system information. The UE may acquire the neighbor cell list from the system information. According to various embodiments of the present disclosure, the neighbor cell list may include at least one of the intra-frequency neighbor cell list and the inter-frequency neighbor cell list.

At operation S840, the UE may receive the cell information transmitted by the eNB. The cell may be an interferer cell to the UE or a candidate cell capable of performing cooperative transmission to the UE. The cell information also may include the index corresponding to the cell ID listed in the neighbor cell list.

At operation S850, the UE may acquire detailed information on the cell (e.g., cell ID), based on the received neighbor cell list.

At operation S860, the UE may complete the rest of the procedure based on the acquired cell ID. For example, if the cell is the interferer cell, the UE may transmit/receive data, cancelling of the interference based on the interferer cell ID.

Figure 9:
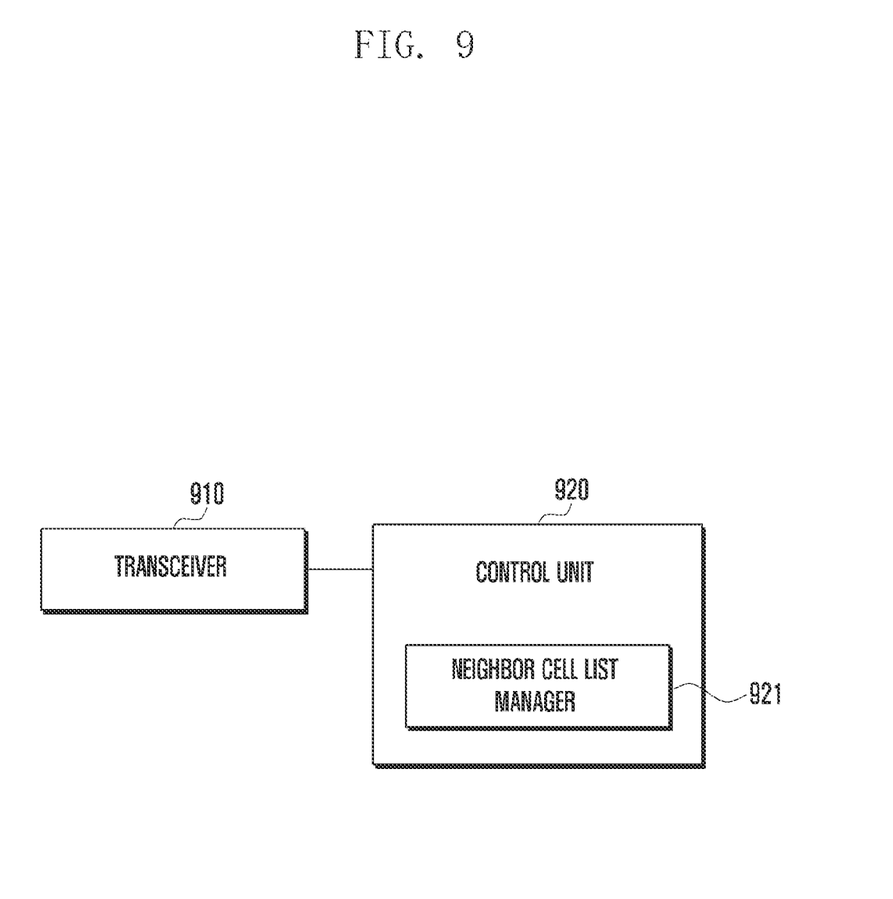
FIG. 9 is a block diagram illustrating a configuration of an eNB according to an embodiment of the present disclosure.

FIG. 9 is a block diagram illustrating a configuration of an eNB according to an embodiment of the present disclosure.

Referring to FIG. 9, the eNB includes a transceiver 910 and a control unit 920.

The transceiver 910 transmits and receives signals to and from the UE. The signals may include control signals and data. According to various embodiments of the present disclosure, the transceiver 910 may transmit the system information or physical layer control signal such as PDCCH to the UE.

According to various embodiments of the present disclosure, the control unit 920 may control the operation of the eNB. For example, the control unit 920 may control signal flows among the function blocks to control the operation of the eNB to transmit the cell information to the UE.

According to various embodiments of the present disclosure, the control unit 920 may include a neighbor cell list manager 921.

The neighbor cell list manager 921 may transmit the system information including the neighbor cell list listing at least one cell ID to the UE. The neighbor cell list manager 921 may control to transmit the information on at least one cell selected according to a predetermined rule based on the neighbor cell list to the UE.

According to various embodiments of the present disclosure, the neighbor cell list manager 921 may control to transmit the index information corresponding to the cell identifier of the selected cell to the UE.

The neighbor cell list manager 921 may control to generate Downlink Control Information (DCI) including the index information corresponding to the cell identifier and transmits the DCI to the UE. According to various embodiments of the present disclosure, the neighbor cell list manager 921 may control to transmit the index information corresponding to the cell identifier to the UE in the form of a combination of DMRS port and scrambling identity field.

Although the control unit 920 and the neighbor cell list manager 921 are depicted as separated blocks responsible for different functions, the present disclosure is not limited thereto. For example, the function of the neighbor cell list manager 921 may be performed by the control unit 920.

Figure 10:
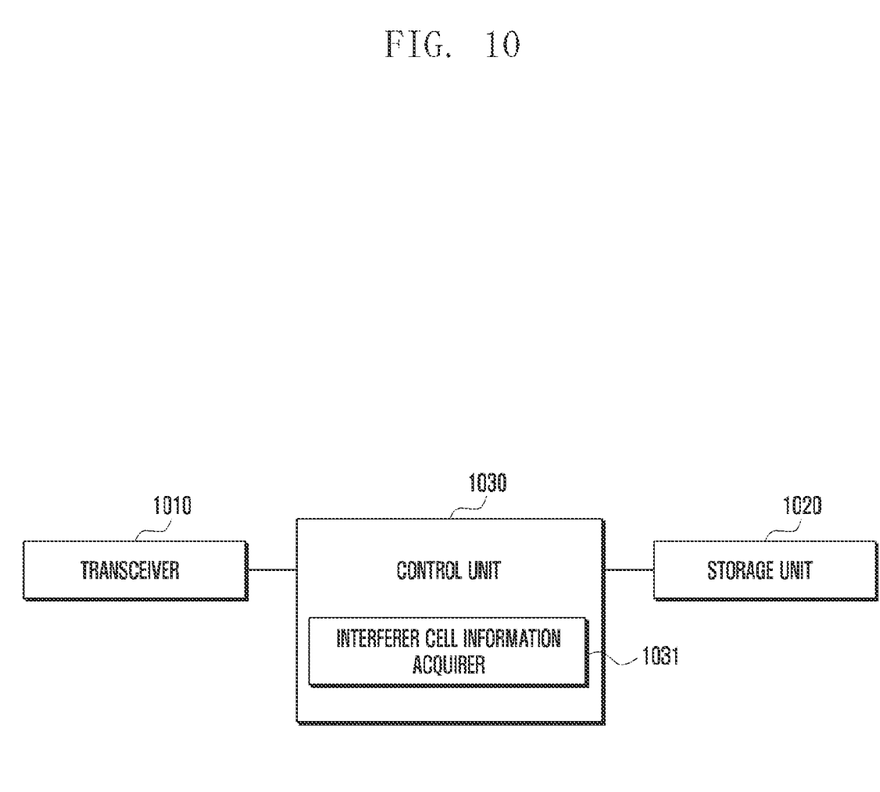
FIG. 10 is a block diagram illustrating a configuration of a UE according to an embodiment of the present disclosure.

FIG. 10 is a block diagram illustrating a configuration of a UE according to an embodiment of the present disclosure.

Referring to FIG. 10, the UE may include a transceiver 1010, a storage unit 1020, and a control unit 1030.

The transceiver 1010 may transmit/receive signals to and from the eNB. The signals may include control signals and data. According to various embodiments of the present disclosure, the transceiver 1010 may receive the system information and physical layer control signal such as PDCCH.

The storage unit 1020 may store various programs related to the operation of the UE. According to various embodiments of the present disclosure, the storage unit 1020 may store the neighbor cell list extracted from the system information transmitted by the eNB.

According to various embodiments of the present disclosure, the control unit 130 controls operation of the UE. For example, the control unit 1030 controls the signal flows among the function block for the UE to receive the cell information from the eNB and check (e.g., analyze) the received cell information. In order to receive the cell information from the eNB and/or check (e.g., analyze) the received cell information, the control unit 1030 may further include an interferer cell information acquirer 1031.

The interferer cell information acquirer 1031 may receive the system information including the neighbor cell list having at least one cell ID. The neighbor cell information acquirer 1031 may receive the information on at least one cell selected according to a predetermined rule from the eNB. The interferer cell information acquirer 1031 may check the cell based on the neighbor cell list and the cell information.

In this case, the interference cell information acquirer 1031 may receive the index information corresponding to the cell identifier of the selected cell from the eNB. The interferer cell information acquirer 1031 may check the cell information, (e.g., interferer cell information), transmitted by the eNB based on the index information and the neighbor cell list.

According to various embodiments of the present disclosure, the interferer cell information acquirer 1031 may receive the Downlink Control Information (DCI) including the index information corresponding to the cell identifier and check the index information corresponding to the cell identifier by decoding the DCI.

According to various embodiments of the present disclosure, the UE may receive the index information corresponding to the cell identifier in the form of a combination of a DMRS port and scrambling identity field and check (e.g., determine) the cell information based thereon.

The cell information transmission method and apparatus according to various embodiments of the present disclosure may be capable of reducing the amount of cell information to be transmitted to the UE. Accordingly, the cell information transmission method and apparatus according to various embodiments of the present disclosure may be advantageous in terms of network transmission efficiency.

As described above, the cell information transmission method and apparatus of the present disclosure may be advantageous in terms of reducing the amount of cell information to be transmitted to the UE. Accordingly, the cell information transmission method and apparatus according to various embodiments of the present disclosure may improve network transmission efficiency.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A cell information transmission method by a base station in a wireless communication system, the cell information transmission method comprising:
   generating, by at least one processor of the base station, a neighbor cell list having at least one cell identifier (ID) and at least one index corresponding to each of the at least one cell ID;
   transmitting, by a transceiver of the base station, to a terminal, a first message including a system information block, the system information block including the neighbor cell list;
   selecting, by the at least one processor, at least one cell ID from the neighbor cell list based on a predetermined rule; and
   transmitting, by the transceiver, to the terminal, a second message including the at least one index corresponding to the selected at least one cell ID via a physical downlink control channel (PDCCH).

2. The method of claim 1, wherein the neighbor cell list comprises at least one of an intra-frequency neighbor cell list and an inter-frequency neighbor cell list.

3. The method of claim 2, wherein the transmitting of the second message including the cell information comprises:
   generating downlink control information (DCI) including an index corresponding to the cell ID; and
   transmitting to the terminal, the DCI.

4. The method of claim 2, wherein the transmitting of the second message including the cell information comprises:
   transmitting to the terminal, an index corresponding to the cell ID in the form of a combination of a demodulation reference signal (DMRS) port and a scrambling identity field.

5. A non-transitory computer-readable storage medium storing instructions that, when executed, cause at least one processor to perform the method of claim 1.

6. The method of claim 1, wherein the first message and the second message are transmitted by the base station via different channels.

7. A cell information reception method by a terminal in a wireless communication system, the cell information reception method comprising:
   receiving, by a transceiver of the terminal, from a base station, a first message including a system information block, the system information block including a neighbor cell list having at least one cell identifier (ID) and at least one index corresponding to each of the at least one cell ID;
   receiving, by the transceiver, from the base station, a second message including the at least one index corresponding to at least one cell selected from the neighbor cell list based on a predetermined rule via a physical downlink control channel (PDCCH); and
   determining, by at least one processor of the terminal, the cell based on the neighbor cell list received in the first message and the at least one index received in the second message.

8. The method of claim 7, wherein the neighbor cell list comprises at least one of an intra-frequency neighbor cell list and an inter-frequency neighbor cell list.

9. The method of claim 8, wherein the receiving of the second message including the cell information comprises:
   receiving, from the base station, downlink control information (DCI) including an index corresponding to the cell ID; and
   determining the index corresponding to the cell ID by decoding the DCI.

10. The method of claim 8, wherein the receiving of the second message including the cell information comprises:
receiving from the base station, an index corresponding to the cell ID in the form of a combination of a demodulation reference signal (DMRS) port and a scrambling identity field.

11. A non-transitory computer-readable storage medium storing instructions that, when executed, cause at least one processor to perform the method of claim 7.

12. The method of claim 7, wherein the first message and the second message are received by the terminal via different channels.

13. A base station transmitting cell information in a wireless communication system, the base station comprising:
a transceiver configured to transmit and receive signals to and from a terminal; and
at least one processor configured to:
generate a neighbor cell list having at least one cell identifier (ID) and at least one index corresponding to each of the at least one cell ID,
control the transceiver to transmit a first message including a system information block to a terminal, the system information block including the neighbor cell list,
select at least one cell ID from the neighbor cell list based on a predetermined rule, and
control the transceiver to transmit a second message to the terminal including the at least one index corresponding to the selected at least one cell via a physical downlink control channel (PDCCH).

14. The base station of claim 13, wherein the neighbor cell list comprises at least one of an intra-frequency neighbor cell list and an inter-frequency neighbor cell list.

15. The base station of claim 14, wherein the at least one processor is further configured to generate downlink control information (DCI) including an index corresponding to the cell ID, and to control the transceiver to transmit the DCI to the terminal.

16. The base station of claim 14, wherein the at least one processor is further configured to control the transceiver to transmit an index corresponding to the cell ID in the form of a combination of a demodulation reference signal (DMRS) port and a scrambling identity field to the terminal.

17. The base station of claim 13, wherein the at least one processor is further configured to control the transceiver to transmit the first message and the second message via different channels.

18. A terminal receiving cell information in a wireless communication system, the terminal comprising:
a transceiver configured to transmit and receive signals to and from a base station; and
at least one processor configured to:
control the transceiver to receive a first message including a system information block from a base station, the system information block including a neighbor cell list having at least one cell identifier (ID) and at least one index corresponding to each of the at least one cell ID, and
control the transceiver to receive a second message including the at least one index corresponding to at least one cell selected from the neighbor cell list based on a predetermined rule via a physical downlink control channel (PDCCH), and
determine the cell based on the neighbor cell list received in the first message and the at least one index received in the second message.

19. The terminal of claim 18, wherein the neighbor cell list comprises at least one of an intra-frequency neighbor cell list and an inter-frequency neighbor cell list.

20. The terminal of claim 19, wherein the at least one processor is further configured to control the transceiver to receive downlink control information (DCI) including an index corresponding to the cell ID from the base station and to determine the index corresponding to the cell ID by decoding the DCI.

21. The terminal of claim 19, wherein the at least one processor is further configured to control the transceiver to receive an index corresponding to the cell ID in the form of a combination of a demodulation reference signal (DMRS) port and a scrambling identity field from the base station.

22. The terminal of claim 18, wherein the at least one processor is further configured to control the transceiver to receive the first message and the second message via different channels.

* * * * *